United States Patent [19]

Falck et al.

[11] 4,344,524

[45] Aug. 17, 1982

[54] FINES REMOVAL IN HORIZONTAL COOLERS

[75] Inventors: Glenn H. Falck; James R. Boose, both of Montgomery, Pa.

[73] Assignee: Koppers Company, Inc., Pittsburgh, Pa.

[21] Appl. No.: 180,160

[22] Filed: Aug. 21, 1980

[51] Int. Cl.$^3$ ..................... B65G 17/32; B65G 45/00
[52] U.S. Cl. ..................... 198/494; 34/85; 34/207; 34/236; 198/537
[58] Field of Search ............... 198/494, 537, 822, 850, 198/853, 952; 34/85, 102, 207, 208, 236; 165/70

[56] References Cited

U.S. PATENT DOCUMENTS

| | | | |
|---|---|---|---|
| 2,343,762 | 3/1944 | Franklin | 198/494 |
| 2,391,199 | 12/1945 | Shallock | 198/537 |
| 3,759,369 | 9/1973 | Vering et al. | 198/853 X |

*Primary Examiner*—Jeffrey V. Nase
*Attorney, Agent, or Firm*—Thomas F. Shanahan; Herbert J. Zeh; Oscar B. Brumback

[57] ABSTRACT

Disclosed are an apparatus and method for removing the fines that fall through the load run and accumulate on the return run of a foraminous, endless conveyor. In accordance with the invention, the fines are collected on the return run, conveyed on the load run to the discharge end of the conveyor and then passed through the conveyor at its discharge end.

20 Claims, 7 Drawing Figures

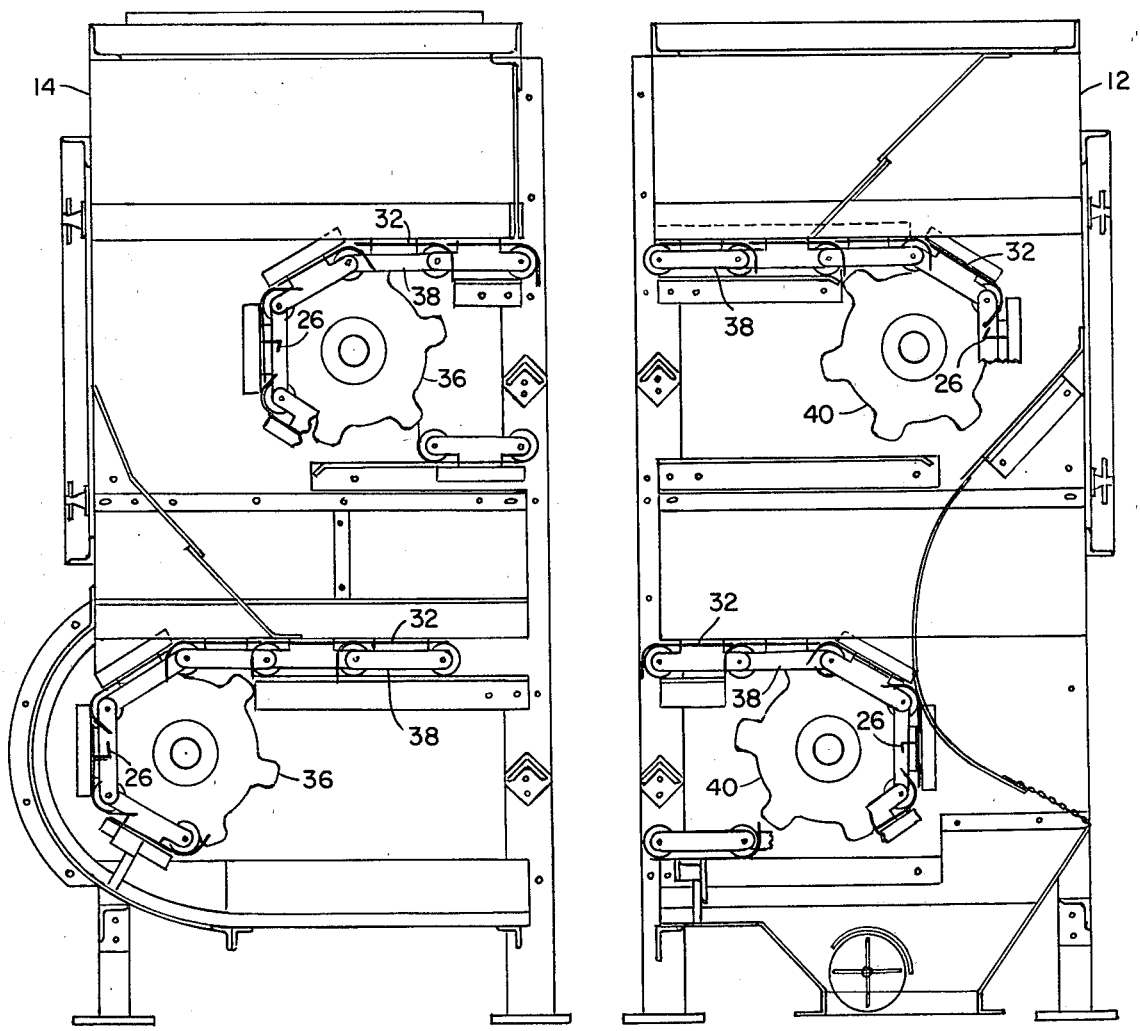
FIG. 5
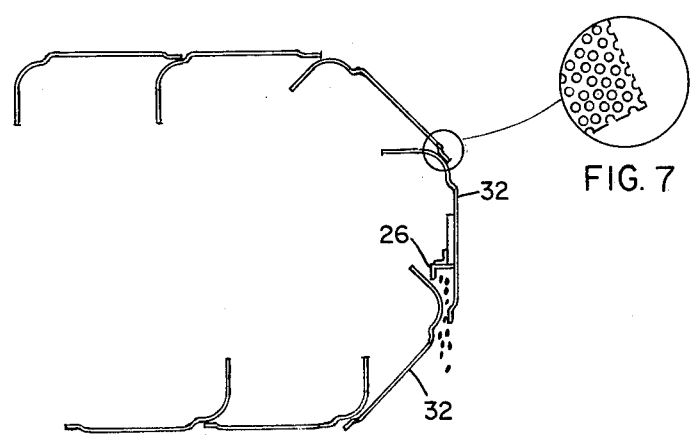
FIG. 6
FIG. 7

FINES REMOVAL IN HORIZONTAL COOLERS

BACKGROUND OF THE INVENTION

1. Field of the Invention

This invention relates to the removal of particulate fines from the return run of a continuous conveyor and, more specifically, to the removal of animal food fines that fall through the load run and accumulate on the return run of a substantially horzontal, foraminous, endless, cooler conveyor that is fed by a pellet mill or the like. In particular, the invention relates to a food pellet fines removal system in which, in the operation of a substantially horizontal cooler/dryer, the fines are collected on the return run, conveyed on the load run to the discharge end of the conveyor and, thence, passed through the conveyor at its discharge end for ultimate removal with the food product.

2. Description of the Prior Art

Applicants' assignee manufactures a horizontal pellet cooler that generally consists of one or more chain and sprocket driven perforated metal carriers enclosed in a housing. Each carrier is made up of individual trays joined together to form an endless belt having an upper surface (the product or load carrying side) and a lower surface (the return side). Hot, moist, pellets are distributed on the upper surface and they are cooled and dried as air is drawn through the carrier perforations. The diameter of the perforations is selected to be smaller than the nominal size of the pellets being conveyed. However, a portion of this material, i.e., fines, will be small enough to pass through these perforations.

In general, if these fines are able to pass through the upper surface, they should be able to pass through the lower surface. However, this is not always the case. A portion of these fines will be retained on the lower surface and will be carried toward the turn-around end. This material becomes trapped and, in time, a sufficient quantity of fines can accumulate to cause problems. One of these problems is possible contamination of subsequent material processed through the cooler. Another problem is that a sufficient quantity of fines can accumulate and cause individual trays to bow or bend under this load. These trays have been designed to be loaded on the upper surface only. In any other position they are weak and will gap or will separate.

One known solution for the removal of these trapped fines is the use of screw flighting mounted on the sprocket shaft of the carrier. This flighting is welded to the shaft and is so arranged to deflect the fines toward the outside edges of the carrier. Slots are cut in the sprockets for passage of the fines material therethrough. This method, while partially successful, does have several drawbacks. First, a sufficient quantity of fines must accumulate before the flighting can be effective. Second, once the material is moved outside the carrier, there is still a problem with its removal from the carrier housing. Also, there are ledges where it can accumulate as it attempts to fall to the bottom of the carrier housing. Accordingly, a better fines removal system has been sought.

Additional known conveyor cleaner systems are those disclosed in U.S. Pat. No. 3,504,786 to Matson and U.S. Pat. No. 3,759,369 to Vering et al. However, neither of these conveyor cleaner systems are found to be pertinent to the fines removal system of the present invention.

SUMMARY OF THE INVENTION

In accordance with the present invention, disclosed are a novel means and method for removing the fines that fall through the load run and accumulate on the return run of a foraminous, endless conveyor. In particular, in carrying out the invention, the fines are collected on the return run, conveyed on the load run to the discharge end of the conveyor and then passed through the conveyor at its discharge end to commingle with the other treated product. In this manner of handling animal food pellets material, excessive build-up of fines in the conveyor mechanism is avoided, as is also potential cross-contamination of one run of food product with a subsequent run or runs of a different food product.

The foregoing and other objects, features and advantages of this invention will become more apparent with further consideration of the disclosure thereof and, in particular, when viewed in conjunction with the following specification, the accompanying drawings and the appended claims.

BRIEF DESCRIPTION OF THE DRAWINGS

FIG. 5 is a schematic, interior view of the inlet end section and the tail end section of a horizontal cooler, with the general location of several fines cup assemblies being indicated.

FIG. 6 is a schematic illustration of a fines cup assembly of this invention discharging collected fines through a conveyor at its discharge end.

FIG. 7 is an enlargement of the encircled portion of FIG. 6 illustrating the layout of perforations in a foraminous carrier tray.

DESCRIPTION OF THE PREFERRED EMBODIMENT

Figure 1:
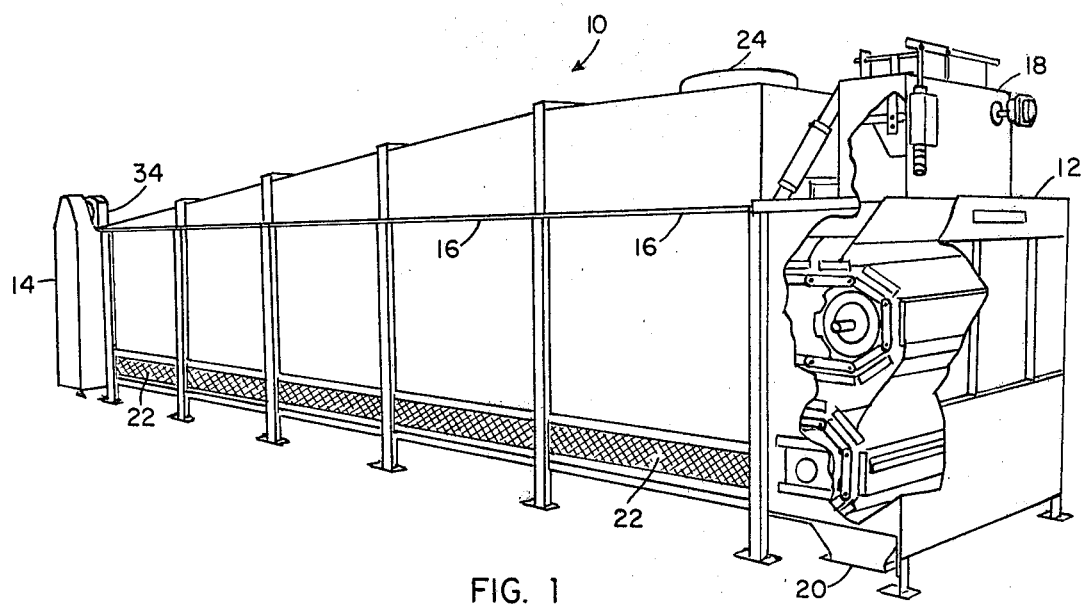
FIG. 1 is a schematic perspective, partly broken away, of a double pass, horizontal pellet cooler to which the present invention pertains.

Referring to FIG. 1, there is illustrated a horizontal or substantially horizontal pellet cooler 10 of a type to which the present invention is specifically directed. Pellet cooler 10 generally comprises an inlet end section 12, a tail end section or drive section 14 and one or more modular designed, intermediate cooling sections 16 of a number sufficient to provide the desired pellet cooler length. The pellet cooler 10 may be either a double pass unit, as shown, or a single pass unit (not shown). In the double pass or double conveyor unit shown, the inlet or inlet hopper is at 18 and the discharge or discharge hopper is at the same end of the cooler at 20. The single pass cooler, on the other hand, functions additionally as a conveyor, since pellets are cool/dried, conveyed and discharged at the end opposite the inlet. For cooling of the pellet material, air is drawn into the unit 10 through grilles 22 and through the bed or beds of pellet material being conveyed by means of a fan or cyclone (not shown) operatively connected to duct 24.

Figures 2, 3:
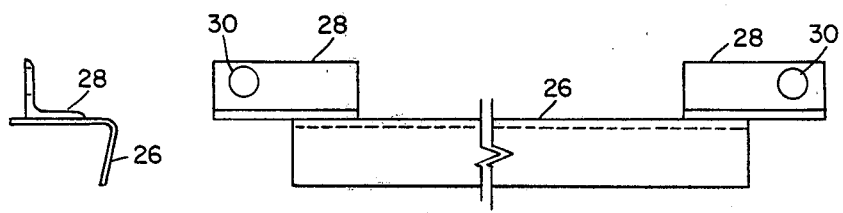
FIG. 2 is a plan view of a fines cup assembly of this invention.
FIG. 3 is a left end view of the fines cup assembly of FIG. 2.

Turning now to FIGS. 2 and 3, shown are a plan and left side view, respectively, of a fines cup assembly of this invention. Basically, the fines cup 26 is an elongated, substantially L-shaped (the foot is preferably up-turned about 10 degrees) metallic member designed to extend transversely of the conveyor path at spaced locations (typically 10 feet) about the interior periphery of the single conveyor, in a single pass unit, and at least the top conveyor, but preferably both conveyors, in a double pass unit. As shown, attached to each end of fines cup 26, as by welding, is a short length, e.g., 2 to 3 inches, of metal angle 28 for the purpose of attaching the fines cup 26 to the conveyor chain and the perforated metal trays, as by bolts passing through bolt holes 30.

Figure 4:
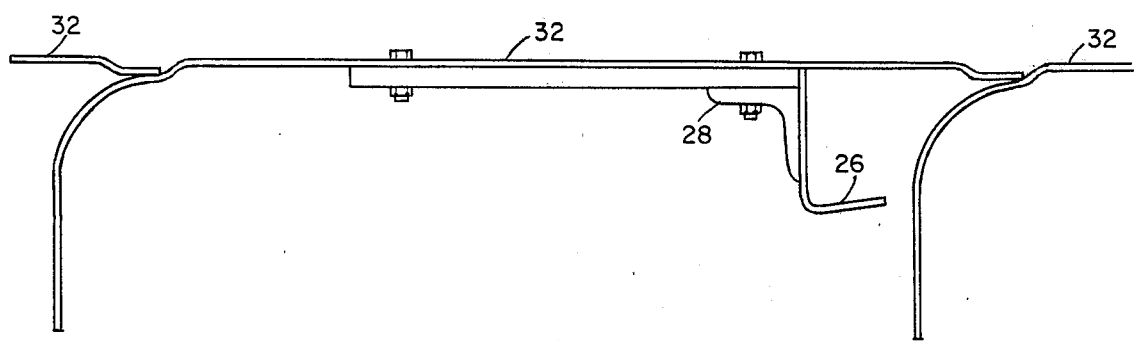
FIG. 4 is a side elevation showing a fines cup assembly of this invention mounted on a perforated carrier tray.

In this latter regard, attention is now directed to FIG. 4 which shows schematically a fines cup 26 in position for attachment by angles 28 (one shown) to a perforated metal tray 32 and to a carrier chain (not shown). As will be noted, the perforated metal trays 32 have a substantially L-shaped profile. The endless conveyor or conveyors to which this invention pertains comprises a plurality of elongated, relatively narrow, laterally extending, such perforated trays forming a substantially continuous traveling surface when attached at their longitudinal ends to continuous conveyor chains. Typically, the carrier is constructed of carbon steel perforated metal trays that may be 5 feet long and 16 gage or 7 feet long and 14 gage. Jointures of the trays slide over each other, rather than lap as do most other coolers. This sliding action tends to keep the joints clean and reduces the tendency for the trays to catch and tear out should material collect at the discharge. The trays have a 6 inch effective cooling width. Perforations are either 3/32 inch diameter or 9/64 inch diameter on closely spaced, staggered centers. The trays are supported by a bushed roller chain with pins, bushings and rollers being hardened for superior wear.

In FIG. 5 is shown a schematic side elevation of the inlet end section 12 and the tail end section 14 of a double pass horizontal cooler, with the general location of several fines cups 26 being indicated. Taking FIG. 5 in conjunction with FIGS. 6 and 7, which shows the discharge end of either a single pass conveyor or either or both of the discharge ends of a double pass conveyor, the method of operation of this invention will now be set forth.

In the operation of a horizontal cooler 10, a variable speed drive motor 34 (FIG. 1) drives a pair or pairs of laterally spaced sprockets 36 and, through chains 38 entrained thereabout and about front end idler sprockets 40, provides slow-moving carrier power for perforated metal trays 32. Hot, moist pellets are distributed in a uniform bed depth on the carrier and cooled and dried by air drawn through the perforated carrier. After sufficient retention time, which is a function of carrier speed and length of cooler, the dried pellets are discharged.

Contemporaneously with the foregoing, the fines cups 26 traverse the interior periphery of the conveyor or conveyors. As a fines cup 26 passes around the turn-around end, it collects the fines that have accumulated there. These fines cups then carry the fines on the load run to the opposite or discharge end. As stated previously, the perforated trays are designed for top loading only. As a tray moves around the discharge end and the material slides off its top, the weight of the tray creates a small gap or elongated interstice between its leading edge and the trailing edge portion of its immediately preceding tray. The fines (as shown) are able to pass through this gap and hence are discharged with the product.

As will be appreciated, the use of internal fines cups prevents any appreciable accumulation of fines in the turn-around end of the carrier. The only fines that can begin to accumulate are those between the cups. This quantity is generally quite small and should be entirely removed with the passage of the next cup. Because there is virtually no accumulation of fines, the problem of contamination is greatly reduced or eliminated. Also, the fines that are collected are carried to the opposite end and discharged with the product. They do not have to work their way along a screw, through a slot in a sprocket, through the carrier chain and across a ledge to fall onto the bottom surface of the conveyor housing to be eventually cleaned out.

Although the present invention has been shown and described in connection with a particular embodiment thereof, it will be understood that it may otherwise be embodied within the scope of the following claims.

What is claimed is:

1. A method of removing fines from a foraminous, endless conveyor having a load run, a return run, a discharge end and a turn-around end which collectively define the conveyor path and its interior and exterior periphery and in which said method is adapted to remove fines that fall through said load run and accumulate on said return run, the steps comprising:
   collecting said fines on said return run;
   conveying said collected fines on said load run to the discharge end of the conveyor; and,
   passing said collected fines through said conveyor at said discharge end.

2. A method as in claim 1 in which said endless conveyor is substantially horizontally disposed.

3. A method as in claim 2 in which said fines are primarily collected at the turn-around end of said return run.

4. A method as in claim 3 in which said endless conveyor comprises a plurality of elongated relatively narrow, laterally extending, perforated trays forming a substantially continuous traveling surface and said fines pass through an elongated interstice that forms between successive trays at said discharge end.

5. A method as in claim 4 in which said trays are elongated members having a substantially L-shaped profile.

6. A method as in claim 5 in which said fines are collected and conveyed by elongated substantially L-shaped members extending transversely of the conveyor path at spaced locations about the interior periphery of said conveyor.

7. A method as in claim 6 in which said conveyor comprises a chain conveyor supported at its ends by spaced apart sprockets.

8. A method as in claim 7 in which a plurality of foraminous endless conveyors are vertically aligned.

9. A method as in claim 8 in which at least the top conveyor of said vertically aligned conveyors passes collected fines therethrough at its discharge end.

10. A method as in claim 9 in which each of said endless conveyors passes collected fines therethrough at its discharge end.

11. Apparatus for removing fines from a foraminous, endless conveyor having a load run, a return run, a discharge end and a turn-around end which collectively define the conveyor path and its interior and exterior periphery and in which said apparatus is adapted to remove fines that fall through said load run and accumulate on said return run, said apparatus comprising:

means to collect said fines on said return run and to convey said collected fines on said load run to the discharge end of the conveyor; and means to permit passage of said collected fines through said conveyor at said discharge end.

12. Apparatus as in claim 11 in which said endless conveyor is substantially horizontally disposed.

13. Apparatus as in claim 12 in which said fines are primarily collected at the turn-around end of said return run.

14. Apparatus as in claim 13 in which said endless conveyor comprises a plurality of elongated, relatively narrow, laterally extending, perforated trays forming a substantially continuous traveling surface and said fines pass through an elongated interstice that forms between successive trays at said discharge end.

15. Apparatus as in claim 14 in which said trays are elongated members having a substantially L-shaped profile.

16. Apparatus as in claim 15 in which said fines are collected and conveyed by elongated substantially L-shaped members extending transversely of the conveyor path at spaced locations about the interior periphery of said conveyor.

17. Apparatus as in claim 16 in which said conveyor comprises a chain conveyor supported at its ends by spaced apart sprockets.

18. Apparatus as in claim 17 in which a plurality of foraminous endless conveyors are vertically aligned.

19. Apparatus as in claim 18 in which at least the top conveyor of said vertically aligned conveyors passes collected fines therethrough at its discharge end.

20. Apparatus as in claim 19 in which said endless conveyors passes collected fines therethrough at its discharge end.

* * * * *